United States Patent
Bates

(10) Patent No.: US 12,465,035 B2
(45) Date of Patent: Nov. 11, 2025

(54) STABLE TELESCOPING FISHING ROD PROTECTOR AND METHOD FOR ASSEMBLING SAME

(71) Applicant: Eric M. Bates, Fort Lauderdale, FL (US)

(72) Inventor: Eric M. Bates, Fort Lauderdale, FL (US)

( * ) Notice: Subject to any disclaimer, the term of this patent is extended or adjusted under 35 U.S.C. 154(b) by 13 days.

(21) Appl. No.: 18/196,933

(22) Filed: May 12, 2023

(65) Prior Publication Data

US 2024/0373834 A1    Nov. 14, 2024

(51) Int. Cl.
*A01K 97/08*    (2006.01)

(52) U.S. Cl.
CPC .................................. *A01K 97/08* (2013.01)

(58) Field of Classification Search
CPC ....... A01K 97/08; B65D 21/086; F16L 27/12; F16L 27/127; F16L 27/1273
USPC ....................... 43/26; 220/8; 285/145.1, 302; 403/109.1
See application file for complete search history.

(56) References Cited

U.S. PATENT DOCUMENTS

| | | | | |
|---|---|---|---|---|
| 170,188 A * | 11/1875 | Perry | ..................... | A01K 97/08 43/26 |
| 357,206 A * | 2/1887 | Kamp | ..................... | A01K 97/06 206/315.11 |
| 1,020,044 A * | 3/1912 | Mcguire | ................. | A45B 3/16 135/65 |
| 2,143,720 A * | 1/1939 | Smith | ..................... | A01K 97/08 473/44 |
| 2,149,087 A * | 2/1939 | Fisher | ..................... | A01K 97/08 43/26 |
| 2,299,182 A * | 10/1942 | Schoof | ................. | B65D 21/086 220/8 |
| 2,416,142 A * | 2/1947 | Bennett | ..................... | B65D 3/04 138/140 |
| 2,473,977 A * | 6/1949 | Tutton | ................... | A01K 97/08 220/361 |
| 2,566,647 A * | 9/1951 | Wissman | ............... | A01K 87/00 43/18.1 CT |

(Continued)

FOREIGN PATENT DOCUMENTS

| | | | |
|---|---|---|---|
| CN | 207653364 U | * | 7/2018 |
| CN | 211048223 U | * | 7/2020 |

(Continued)

*Primary Examiner* — Darren W Ark
(74) *Attorney, Agent, or Firm* — The Concept Law Group, PA; Scott D. Smiley; Scott M. Garrett

(57) ABSTRACT

A telescoping fishing rod protector includes at least a first tubular section that can be disposed inside of a second tubular section in a telescoping relationship. Each of the first and second tubular sections include an upper tube portion and a lower tube portion that couple together. The upper tube portion and the lower tube portion of the first tubular section are inserted into opposite ends of the upper tube portion of the second tubular section and coupled together. Then the lower tube portion of the second tubular section is coupled to the upper tube portion of the second tubular section, thereby capturing the first tubular section in the second tubular section. The first tubular section can be moved to adjust the overall length of the fishing rod protector to a desired length, and a fishing rod can then be inserted into the fishing rod protector.

16 Claims, 14 Drawing Sheets

(56) References Cited

U.S. PATENT DOCUMENTS

| | | | | |
|---|---|---|---|---|
| 2,585,602 A * | 2/1952 | Turner | A01K 97/08 | 285/55 |
| 2,595,230 A * | 5/1952 | Daviau | A01K 97/08 | 206/315.11 |
| 2,595,597 A * | 5/1952 | Morseth | A01K 77/00 | 285/302 |
| 2,757,002 A * | 7/1956 | Ryden | A01K 97/00 | 463/47.7 |
| 3,131,503 A * | 5/1964 | Gottula | A01K 97/08 | D22/134 |
| 3,138,891 A * | 6/1964 | Gottula | A01K 97/08 | 43/26 |
| 3,285,459 A * | 11/1966 | Gahm | A61J 7/0046 | 206/218 |
| 3,349,512 A * | 10/1967 | Walker | A01K 97/08 | 43/26 |
| 3,356,246 A * | 12/1967 | Marshall | A01K 97/08 | 220/8 |
| 3,495,280 A * | 2/1970 | Galbiati | E03C 1/20 | 285/31 |
| 3,618,253 A * | 11/1971 | Edwards et al. | A01K 87/025 | 403/109.8 |
| 3,624,948 A * | 12/1971 | De Baker, Sr. | A01K 97/08 | 43/26 |
| 3,772,819 A * | 11/1973 | Ratzlaff | A01K 97/08 | 43/26 |
| 3,811,216 A * | 5/1974 | Sauey | A01K 97/08 | 43/26 |
| 4,210,253 A * | 7/1980 | Rosler | B65D 85/20 | 220/8 |
| 4,223,702 A * | 9/1980 | Cook | F16L 7/00 | 138/155 |
| 4,230,234 A * | 10/1980 | Taylor | E02D 29/12 | 220/8 |
| 4,543,677 A * | 10/1985 | Haglund | F24F 13/0263 | 138/155 |
| 5,005,743 A * | 4/1991 | Ramsay | A63C 11/027 | 224/601 |
| 5,259,140 A * | 11/1993 | Epperson | A01K 87/025 | 43/18.1 CT |
| 5,450,956 A * | 9/1995 | Peckenpaugh, Sr. | A01K 97/08 | 220/8 |
| 5,605,242 A * | 2/1997 | Hwang | B65D 21/086 | 220/4.03 |
| 5,640,795 A * | 6/1997 | Wambolt | A01K 97/08 | 206/315.11 |
| 5,829,591 A * | 11/1998 | Lyons | B65D 21/086 | 220/8 |
| 5,951,065 A * | 9/1999 | Roesner | F16L 37/505 | 285/302 |
| 6,062,382 A * | 5/2000 | Czerkie | A01K 97/08 | 206/443 |
| 6,450,333 B1 * | 9/2002 | McClenahan | B65D 21/086 | 220/8 |
| 6,760,994 B2 * | 7/2004 | Henault | A01K 97/08 | 206/315.11 |
| D544,303 S * | 6/2007 | Strepkoff | D7/512 | |
| 8,646,640 B2 * | 2/2014 | Faris | B65D 51/1644 | 220/8 |
| 8,650,796 B1 * | 2/2014 | Bates | A01K 97/08 | 220/8 |
| 8,789,694 B2 * | 7/2014 | Roesler | B65D 21/086 | 206/349 |
| 9,033,172 B2 * | 5/2015 | Thati | A47K 10/22 | 206/394 |
| 10,375,944 B2 * | 8/2019 | Smigaj | B60R 9/08 | |
| 10,611,521 B1 * | 4/2020 | Piernot | B65D 3/28 | |
| 10,638,738 B1 * | 5/2020 | Stevenson | A01K 87/025 | |
| D916,459 S * | 4/2021 | Wilson | D3/260 | |
| 11,643,249 B2 * | 5/2023 | Smith | B65D 21/086 | 220/8 |
| 11,767,148 B2 * | 9/2023 | Adams | A47G 19/2272 | 220/8 |
| 11,950,584 B1 * | 4/2024 | Hill | A01K 97/10 | |
| 2002/0104560 A1 * | 8/2002 | Kelley | A01K 97/08 | 135/18 |
| 2002/0178642 A1 * | 12/2002 | Garcia | A01K 97/08 | 43/26 |
| 2003/0222082 A1 * | 12/2003 | Sanderson | A63B 71/0036 | 220/8 |
| 2004/0045212 A1 * | 3/2004 | Henault | A01K 97/08 | 43/26 |
| 2008/0264944 A1 * | 10/2008 | Hui | A01K 97/08 | 220/230 |
| 2010/0186282 A1 * | 7/2010 | Wada | A01K 97/08 | 43/26 |
| 2010/0308042 A1 * | 12/2010 | Faris | B65D 21/08 | 220/8 |
| 2015/0076149 A1 * | 3/2015 | Roesler | B65D 43/022 | 220/212 |
| 2017/0280700 A1 * | 10/2017 | Parker | B65D 25/54 | |
| 2018/0279597 A1 * | 10/2018 | Wilson | A01K 97/08 | |
| 2019/0152649 A1 * | 5/2019 | Hadar | B65D 85/20 | |
| 2019/0230911 A1 * | 8/2019 | Smigaj | A45F 5/00 | |
| 2019/0387730 A1 * | 12/2019 | Sandland, Sr. | A01K 97/10 | |
| 2020/0323188 A1 * | 10/2020 | Beasley, Jr. | B60R 9/08 | |

FOREIGN PATENT DOCUMENTS

| | | | | |
|---|---|---|---|---|
| CN | 212306568 U | * | 1/2021 | |
| JP | 2021078360 A | * | 5/2021 | |
| KR | 200449972 Y1 | * | 8/2010 | |
| WO | WO-2007083391 A1 | * | 7/2007 | A01K 97/08 |
| WO | WO-2019079346 A1 | * | 4/2019 | A01K 97/08 |

* cited by examiner

STABLE TELESCOPING FISHING ROD PROTECTOR AND METHOD FOR ASSEMBLING SAME

FIELD OF THE INVENTION

The present invention relates generally to fishing rod protectors, and, more particularly, relates to a telescoping fishing rod protector with telescoping sections that provide continuous engagement between sections as they are moved relative to each other to both allow the sections to be adjusted to any position and remain relatively stable in that position, and further, the sections remain coaxial and are not subject to misalignment.

BACKGROUND OF THE INVENTION

Fishing is a commonly practiced endeavor by many people in many parts of the world. People use a variety of equipment to fish with, from hand lines to cane poles, to expensive custom-built fishing rods and reels. Perhaps the most common type of fishing rod is the guided rod, which uses a series of "eyes" to guide fishing line along the rod. The eyes also impart force and tension into the line when fighting a fish, and the tension can be controlled by the drag of the reel mounted on the butt end of the rod. Generally, since a fishing rod is held while being used, it is preferable to make the rod light and comfortable to carry. Some of the more expensive fishing rods use advanced materials to achieve a desirable combination of light weight and a sufficiently stiff "action."

One of the problems with conventional guided rods is that they are susceptible to damage, such as when being transported. Given that fishing rods are often used on small boats, they may be inadvertently knocked around, or they can fall over. Further, because of the small operating space on a boat, they may be stepped on or otherwise subject to events that can crush an eye guide, break the tip of a rod, crush a ferrule, and so on. The same is true during travel where bumps experienced by the vehicle can cause other equipment to impact a rod, resulting in damage. There are few things more frustrating for an angler than arriving at a fishing destination and finding their favorite rod has been damaged and rendered unusable.

There are several types of rod protectors available which are generally storage cases or tubes. These typically require that the rod be broken down (the sections taken apart) so that they can fit into the case or tube. However, these types of protectors, while effective, are not practical while actively on a fishing trip, traveling from one fishing location to another in a boat, for example. Another type of fishing rod protector is a form of telescoping structure that uses several tapered, cone-shaped sections. The sections can be extended, one inside another, where the base of one section is too small to fit through the top of the section it is housed in. These type of fishing rod protectors are easy to carry onto a boat, pier, or other place for fishing. However, the cone-section type telescoping fishing rod protectors require the sections to be fully extended in order to achieve the interlocking fit with each other that is necessary to keep the sections extended. This arrangement does not allow a user to adjust the overall length of the fishing rod protector to suit the lengths of various fishing rods.

Therefore, a need exists to overcome the problems with the prior art as discussed above.

SUMMARY OF THE INVENTION

In accordance with some embodiments of the inventive disclosure, there is provided a telescoping fishing rod protector that includes a first tubular section and a second tubular section arranged in a telescoping relationship. The first tubular section fits coaxially inside the second tubular section, and each of the first and second tubular sections include an upper tube portion and a lower tube portion. The upper and lower tube portions of the first and second tube sections have a cylindrical wall as well as an upper end and a lower end. The lower end of the upper tube portion couples to the upper end of the lower tube portion such that the cylindrical wall of the upper tube portion is continuous with the cylindrical wall of the lower tube portion along the upper and lower tube portions. The upper end of the upper tube portion of the first tubular section has a rim that extends outward to an outer diameter that is greater than a diameter of an opening at the upper end of the upper tube portion of the second tube section. The lower end of the lower tube portion of the first tubular section has a plurality of flexible flanges that each have a toe portion that extends outward perpendicular to an axis of the lower tube portion to make contact with an inner surface of the second tubular section.

In accordance with a further feature, the upper end of the upper tube portion of the first tubular section comprises a lanyard anchor.

In accordance with a further feature, the is further included an opening formed through the cylindrical wall of at least one of the upper tube portion or the lower tube portion of the first tubular section.

In accordance with a further feature, the toe portion of each one of the plurality of flanges comprises a rubber strip at an outermost region of the toe portion.

In accordance with a further feature, the inner surface of the upper and lower tube portions of the second tube section comprises a plurality of annular ribs.

In accordance with a further feature, the lower end of the upper tube portion couples to the upper end of the lower tube portion by a threaded boss that mates with a threaded recess.

In accordance with a further feature, an upper end of the upper tube portion of the second tubular section comprises a rim.

In accordance with some embodiments of the inventive disclosure, there is provided a telescoping fishing rod protector that includes a first tubular section that has a cylindrical wall having an outer diameter. The first tubular section is comprised of an upper tube portion and a lower tube portion. The upper end of the upper tube portion has a rim that has an outer diameter, A lower end of the lower tube portion has a plurality of flanges, and each flange has an outward-extending toe portion. A diameter across the plurality of flanges at the toe portions is greater than the outer diameter of the cylindrical wall of the first tubular section. There is also a second tubular section that has a cylindrical wall having an inner diameter that is greater than the outer diameter of the cylindrical wall of the first tubular section and less than the diameter across the plurality of flanges at the toe portions of the lower tube portion of the first tubular section. The second tubular section includes an upper tube portion and a lower tube portion. The upper tube portion has an opening at an upper end of the upper tube portion that has a diameter greater than the outer diameter of the cylindrical wall of the first tubular section and less than the diameter of the rim.

In accordance with a further feature, further including an opening through at least one of the cylindrical sidewall of the first tubular section or the cylindrical sidewall of the second tubular section.

In accordance with a further feature, the lower tube portion of the second tubular section has a plurality of flanges, each flange has an outward-extending toe portion, and a diameter across the plurality of flanges at the toe portions is greater than an outer diameter of the cylindrical wall of the second tubular section.

In accordance with a further feature, the upper end of the upper tube portion of the first tubular section comprises a lanyard anchor.

In accordance with a further feature, the toe portion of each one of the plurality of flanges of the lower tube portion of the first tubular section comprises a rubber strip at an outermost region of the toe portion.

In accordance with a further feature, an inner surface of the upper and lower tube portions of the second tube section comprise a plurality of annular ribs.

In accordance with a further feature, a lower end of the upper tube portion of the first tubular section couples to an upper end of the lower tube portion of the first tubular section by a threaded boss that mates with a threaded recess.

In accordance with a further feature, an upper end of the upper tube portion of the second tubular section comprises a rim.

In accordance with some embodiments of the inventive disclosure, there is provided a method for assembling a telescoping fishing rod protector that includes providing a first tubular section comprised of an upper tube portion and a lower tube portion. The first tubular section has a cylindrical wall that has an outer diameter. An upper end of the upper tube portion has a rim that has an outer diameter that is greater than the outer diameter of the cylindrical wall of the first tubular section. A lower end of the lower tube portion of the first tubular section has a plurality of flanges, and each one of the flanges has a toe portion that extends outward relative to the cylindrical wall such that a distance across the lower end is greater than the diameter of the cylindrical wall. The lower end of the upper tube portion couples to an upper end of the lower tube portion of the first tubular section. The method also includes providing a second tubular section comprised of an upper tube portion and a lower tube portion. The second tubular section has a cylindrical wall that has an inner diameter that is greater than the diameter of the outer diameter if the cylindrical wall of the first tubular section and lesser than the distance across the lower end of the lower tube portion of the first tubular section. An upper end of the upper tube portion has an opening that has a diameter that is greater than the outer diameter of the cylindrical wall of the first tubular section and lesser than the diameter of the rim. A lower end of the upper tube portion of the second tubular section couples to an upper end of the lower tube portion of the second tubular section. The method further includes inserting the lower end of the upper tube portion of the first tube section through the opening at the upper end of the upper portion of the second tubular section, inserting the upper end of the lower tubular portion of the first tubular section into the lower end of the upper tube portion of the second tubular section, coupling the lower end of the upper tube portion of the first tubular section to the upper end of the lower tube portion of the first tubular section inside the upper tube portion of the second tubular section, moving the first tubular section so that the lower end of the lower tube portion into the upper tube portion of the second tubular section, and coupling the lower end of the upper tube portion of the second tubular section to the upper end of the lower tube portion of the second tubular section, thereby capturing the first tubular section inside the second tubular section in a telescoping arrangement.

Although the invention is illustrated and described herein as embodied in a stable telescoping fishing rod protector, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the telescoping sections. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
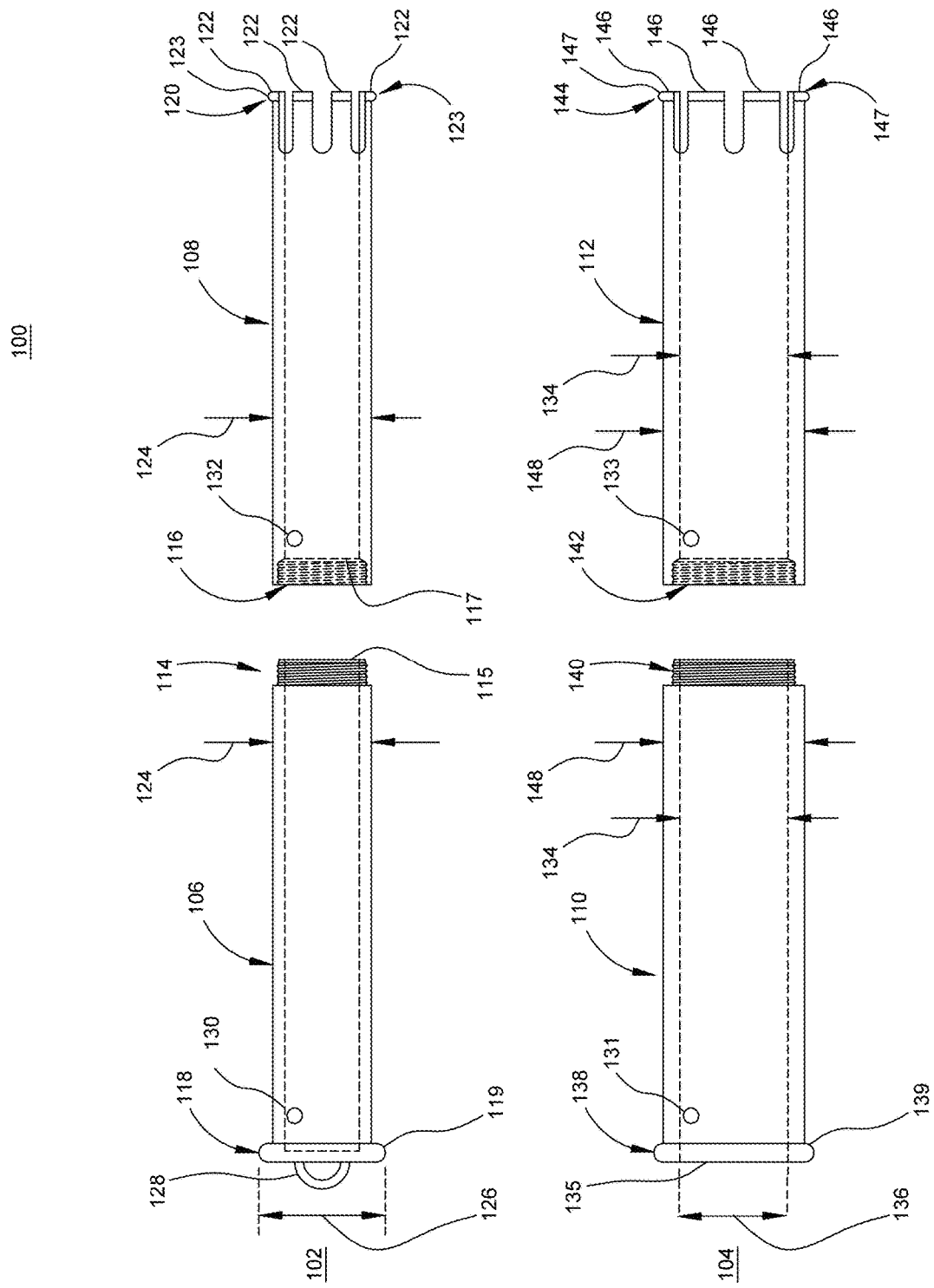
FIG. 1 shows a pair of interlocking sections of a telescoping fishing rod protector, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 shows a pair of interlocking sections 102, 104 of a telescoping fishing rod cover or protector, in accordance with some embodiments. In particular, there is a first tubular section 102 and a second tubular section 104. Each of the tubular sections 102, 104 are generally cylindrical, having a circular cross section, but can equivalently have cross sections of other shapes, including square or triangular, for example. The first and second tubular sections 102, 104 are each comprised of an upper and lower tube section that can be joined together. Importantly, the sections 102, 104 are not conical. First tubular section 102 is comprised of upper tube portion 106 and lower tube portion 108, and second tubular section 104 is comprised of upper tube portion 110 and lower tube portion 112. The upper tube portions 106, 110 and their respective lower tube portions 108, 112 are configured to be joined together to form the first and second tubular sections 102, 104. Thus, upper tube portion 106 has a lower end 114 that joins to the upper end of lower tube portion 108. When joined, the outer surface of the upper tube portion 106 and lower tube portion 108 are continuous across the interface where they join, meaning they are the same size, and there are no substantial bumps, or differences in size between the upper and lower portions 106, 108, and the upper tube portion 106 and lower tube portion 108 have an outer size or diameter 124 that is consistent along substantially the entire length of the first tubular section 102. That is, the size does not substantially change along the length (from right to left on the page) of the first tubular section 102. Thus, outer diameter 124 is the same for both the upper and lower tube portions 106, 108. Likewise for the second tubular section 104; upper tube portion 110 has a lower end 140 that joins to upper end 142 of the lower tube portion 112 in a way the produces a continuous external surface that is consistent in size (cross section) along the length of the second tubular section 104, and the outer diameter 148 is the same for both the upper and lower tube portions 110, 112.

The outside diameter 124 of the first tubular section 102 is smaller than the inside diameter 134 of the second tubular section 104, which is also consistent along the inside of the upper and lower tube portions 110, 112. Further, the outside diameter 124 is also smaller than the diameter 136 of the opening at the upper end 138 of the upper tube portion 110 of the second tubular section 104, which may be smaller than the inner diameter 134 of the upper tube portion 110 and the lower tube portion 112 of the second tubular section 104. Accordingly, most of the first tubular section 102 can fit inside the second tubular section 104 and extend through the opening 135 at the upper end 138 of the upper tube portion 110 of the second tubular section 104. However, the upper end 118 of upper tube portion 106 of the first tubular section 102 has a rim 119 that extends outward and therefore has a diameter 126 that is larger than external diameter 124 of the cylindrical walls of the first tubular section 102, and diameter 126 is also larger than the diameter 136 of the opening 135 at the upper end 138 of the upper tube portion 110. The rim 119 is therefore unable to pass through the opening 135 at the upper end 138 of the upper tube portion 110, which prevents the first tubular section 102 from falling through the second tubular section 104 when the first tubular section 102 is inside the second tubular section 104 as shown, for example, in FIG. 6. The process of getting from the state shown in FIG. 1 to that of FIG. 6 is in part illustrated in FIGS. 2-5.

Figure 3:
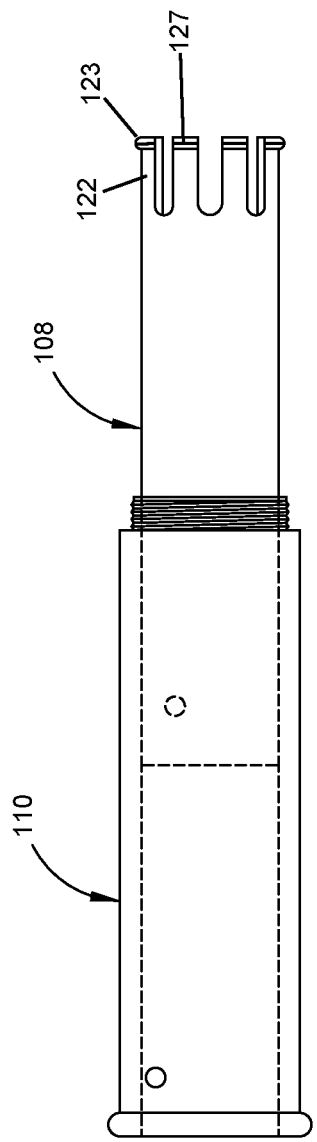
FIG. 3 shows how a lower portion of a smaller section of a telescoping fishing rod protector is further assembled into the upper portion of a larger section of the telescoping fishing rod protector, in accordance with some embodiments.
Figure 6:
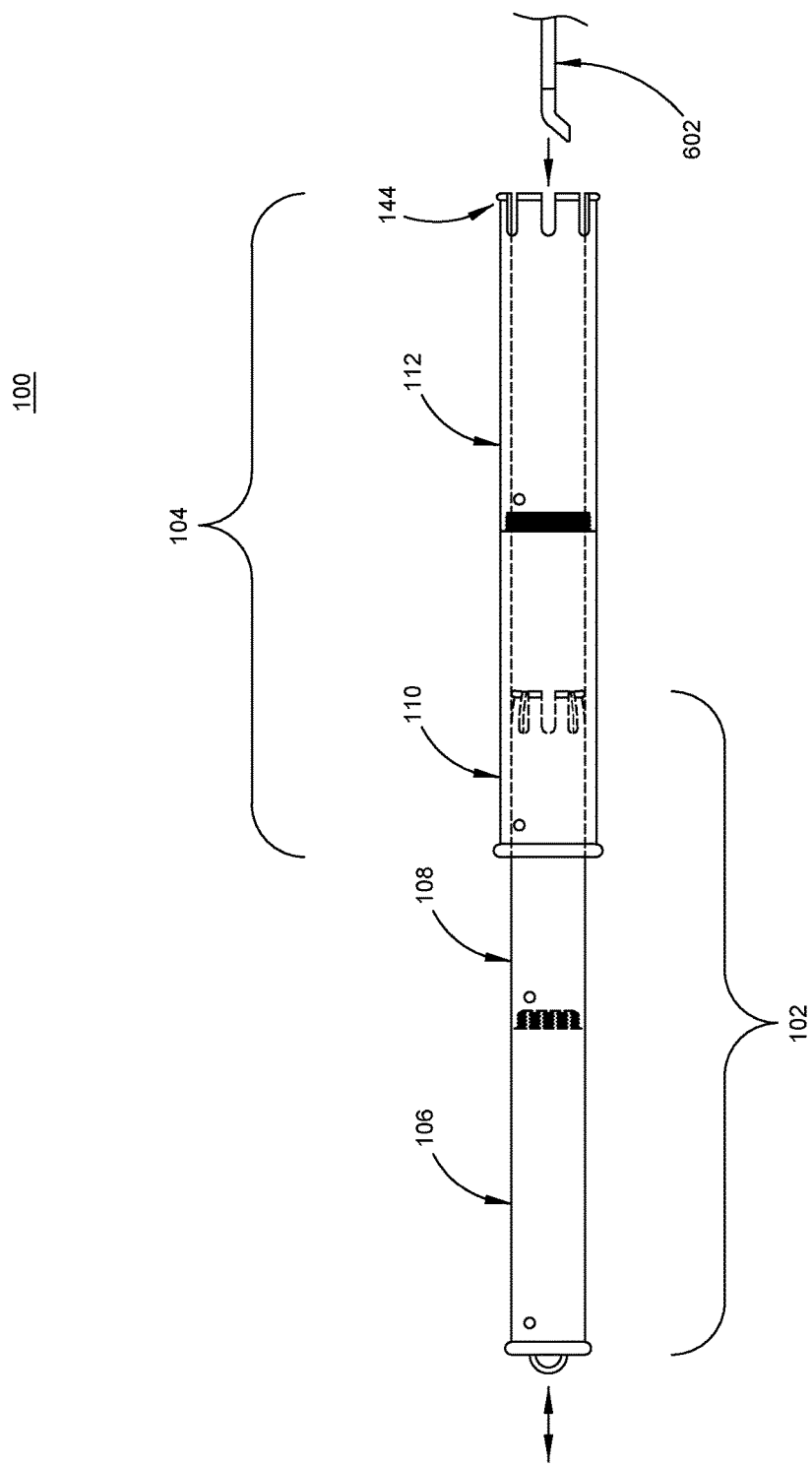
FIG. 6 shows the smaller and larger sections of a telescoping fishing rod protector fully assembled, in accordance with some embodiments.

When assembled as shown in FIG. 6, the first tubular section 102 can slide within the second tubular section 104, which is a telescoping arrangement. To prevent wobbling of the first tubular section 102 when inside the second tubular section 104, the lower end 120 of the lower tube portion 108 includes a plurality of flanges 122 that each have an outward extending toe portion 123. The flanges 122 can be formed by simply providing channels into the body of the lower tube portion 108 that are open at the lower end 120. Each flange 122 can be deflected from their natural position (when no force acts on them) but the material of the lower tube portion 108 urges them back to their natural position, creating an opposing force to any deflecting force. When the lower tube portion 108 is inside the second tubular section 104, the toe portions 123 make contact with the inner surface of the upper and lower tube portions 110, 112, depending on the position of the lower end 120 of the lower tube portion 108 in the second tubular section 104, which causes the flanges 122 to deflect inward, and the resulting forces acting on the flanges 122 through the toe portions 123 keep the lower end 120 substantially centered in the second tubular section 104. In some embodiments, as shown in FIG. 3, the outward-most points of the toe portions 123 can be covered or tipped with a material like rubber in order to increase the friction against the inside surface of the tube section in which they are disposed. This helps hold the tube sections in place relative to each other.

As shown here, the second tubular section 104 is configured similarly to that of the first tubular section 102 in that the lower end 144 of the lower tube portion 112 has a plurality of flanges 146, each having an outward extending toe portion 147. This allows the second tubular section 104 to be itself inserted into another tubular section (i.e. a third tubular section) in the same way that the first tubular section 102 is inserted and held in a telescoping relationship in the second tubular section 104. Accordingly, the upper end 138 of the upper tube portion 110 can have a rim 139 that functions substantially the same as rim 119 to prevent the second tubular section from passing through a third tubular section in which it is arranged. In addition, the various tube portions 106, 108, 110, 112 can each have an opening 130, 131, 132, 133 in their respective sidewalls to allow moisture to escape from inside the telescoping fishing rod cover and thereby reduce the potential for corrosion of components of a fishing rod stored in the tubes. Further, the upper end 118 of the upper tube portion 106 can include lanyard anchor 128 to which the end of a lanyard (or cord) can be tied so that the other end of the lanyard can be connected to a fishing pole when the fishing pole is inside the telescoping fishing rod cover to retain the telescoping fishing rod cover over the fishing rod.

The joint formed between the upper tube portion 106 and lower tube portion 108 can be formed by a threaded boss 115 that extends from the lower end 114 of the upper tube portion 106 and fits into a corresponding threaded recess 117 at the upper end of the lower tube portion 108. The boss 115 and recess 117 can be threaded, or they can have a twist/lock arrangement, or they can be friction fit, or any other known arrangement of coupling two such members together. The interlocking features that hold the upper and lower tube portions 106, 108 together can be such that the connection is detachable, so that the upper and lower tube portions 106, 108 can be detached from each other after being connected, or they can be permanently joined together. Likewise, the upper and lower tube portions 110, 112 can be similarly joined.

Figure 2:
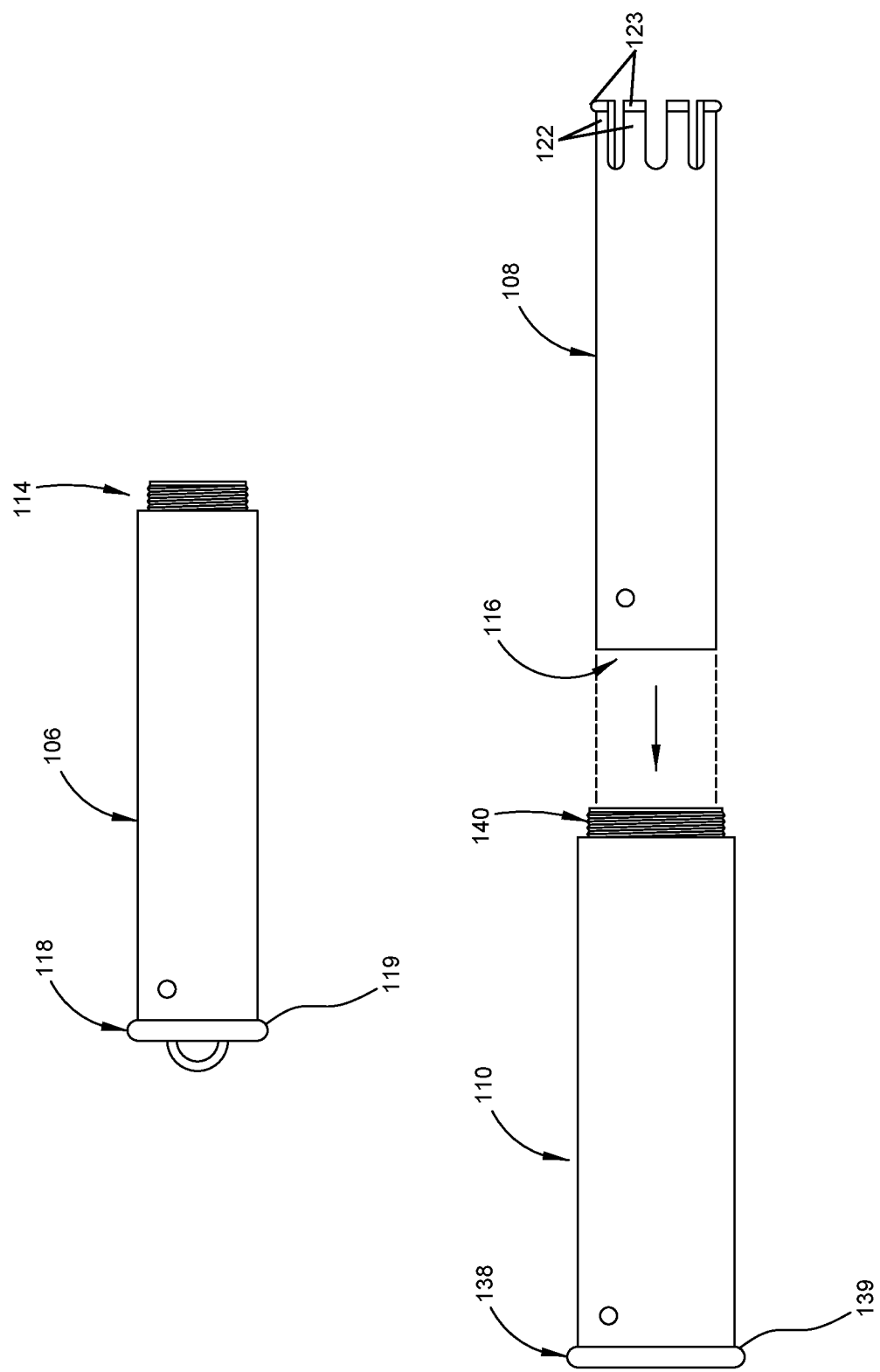
FIG. 2 shows how a lower portion of a smaller section of a telescoping fishing rod protector is assembled into the upper portion of a larger section of the telescoping fishing rod protector, in accordance with some embodiments.
Figure 4:
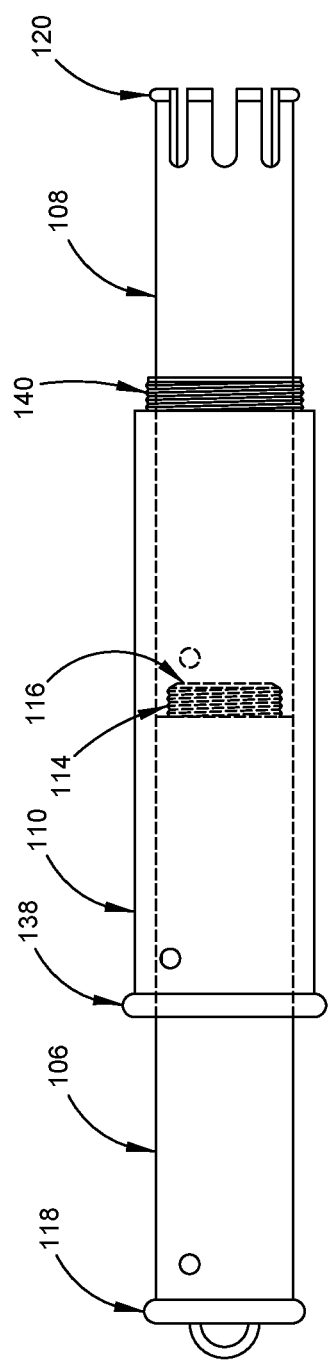
FIG. 4 shows how an upper portion is joined to its corresponding lower portion in the upper portion of a larger section of the telescoping fishing rod protector, in accordance with some embodiments.
Figure 5:
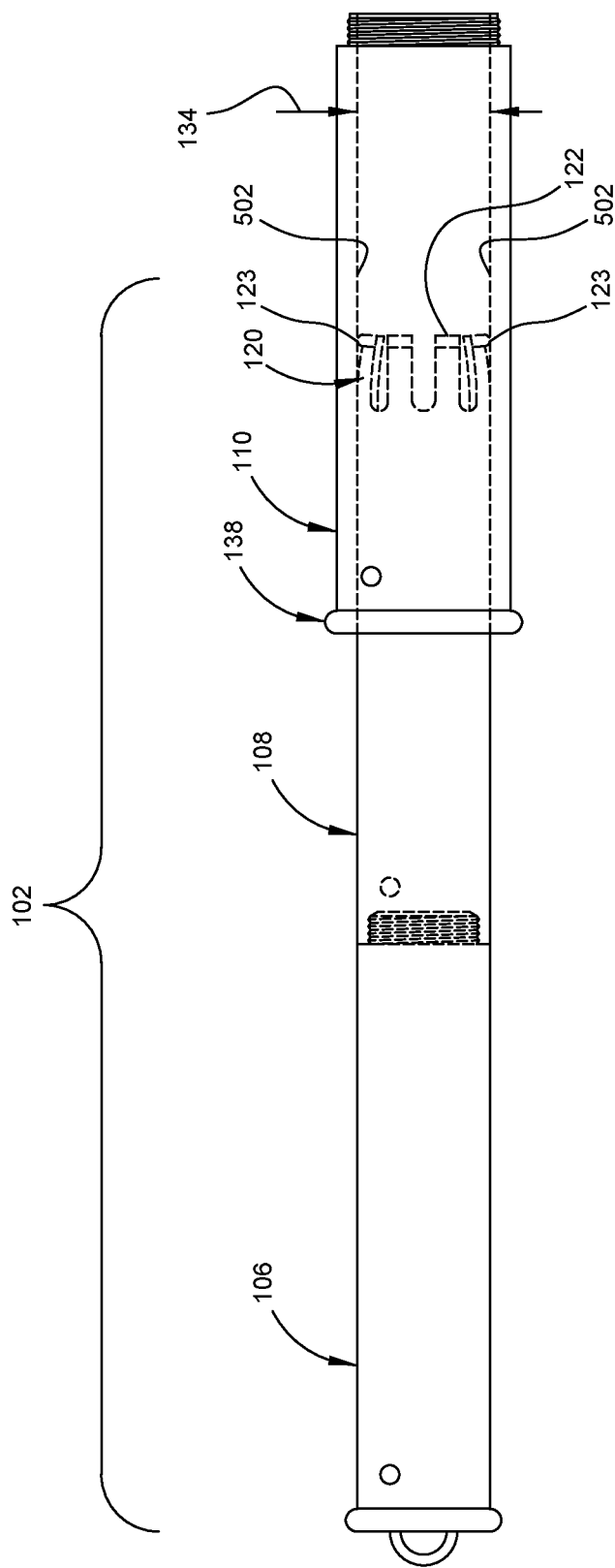
FIG. 5 shows a smaller section of the telescoping fishing rod protector in the upper portion of a large section, in accordance with some embodiments.
Figure 7:
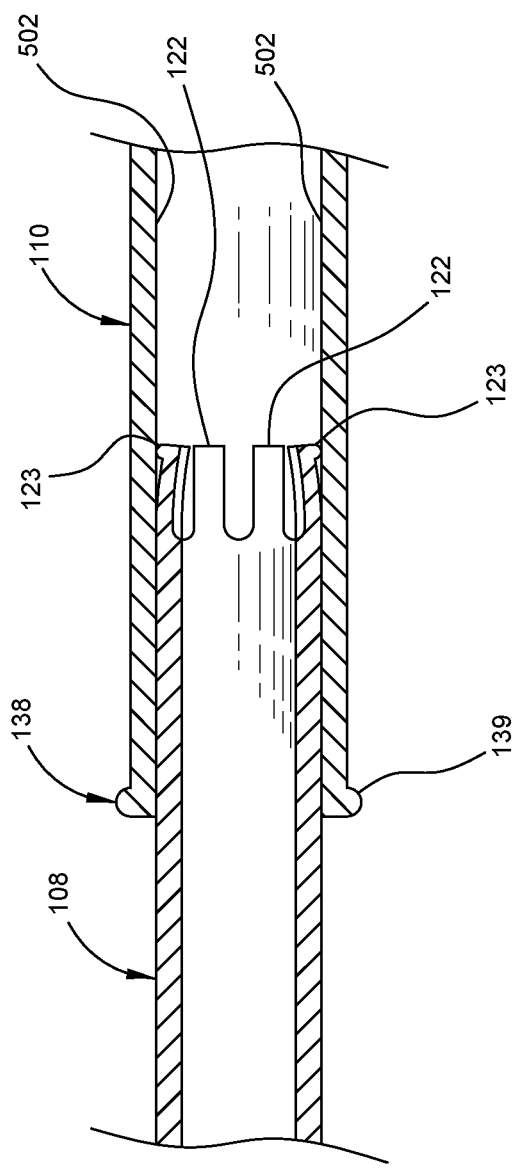
FIG. 7 shows a side cut-away view of an assembled telescoping fishing rod protector, in accordance with some embodiments.
Figure 13:
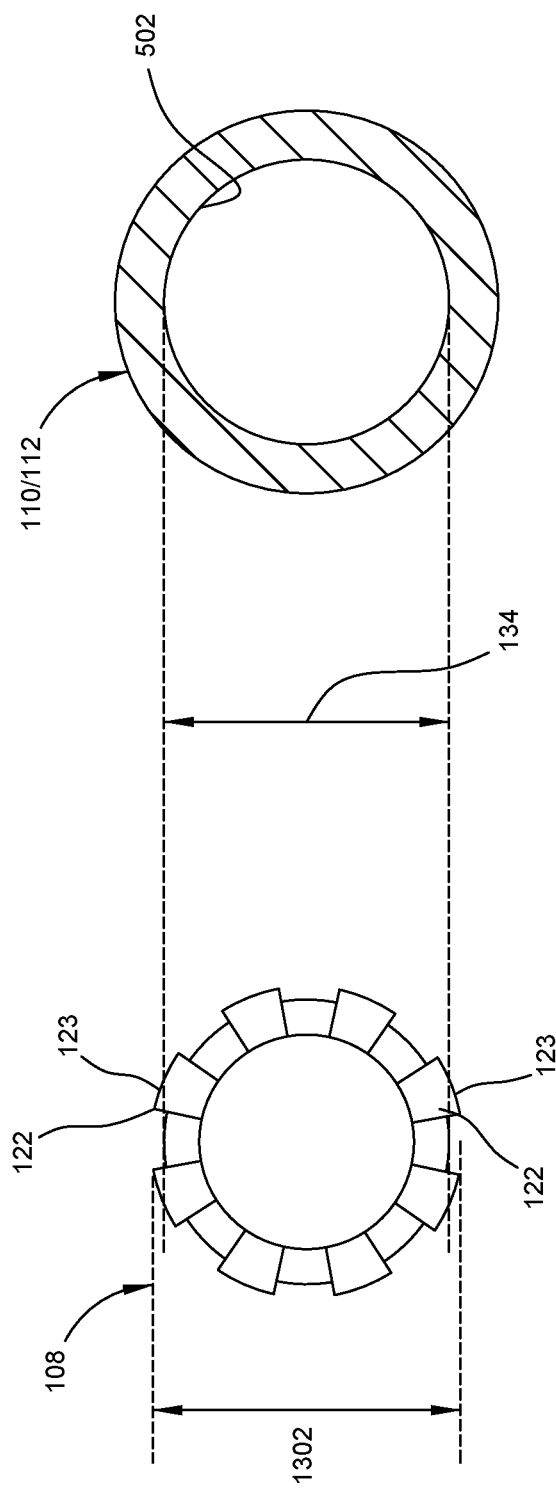
FIG. 13 shows side by side comparisons of an end view of the lower end of the lower tube portion of the first tubular section with a cross section of either the upper or lower tube portion of the second tubular section in a direction perpendicular to the axis of the tube sections.
Figure 14:
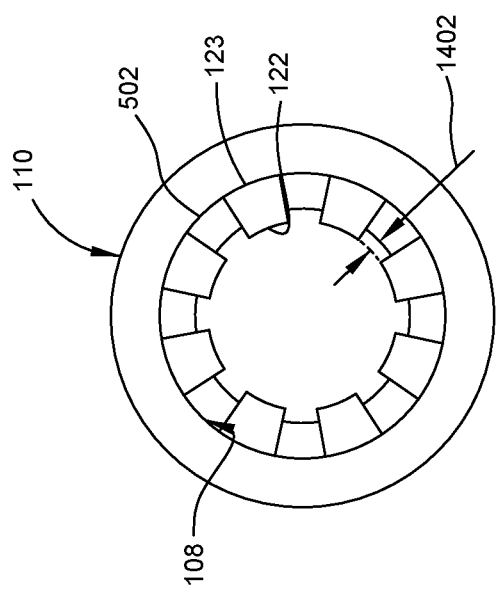
FIG. 14 shows an end view of the lower end of the lower tube portion with the lower tube portion inside the upper tube portion of the second tubular section.

As mentioned, FIGS. 2-5 show various stages of assembling the telescoping fishing rod protector. Because the upper end 118 has the rim 119 that too large to fit into the opening 135 of the second tubular section 104, the components have to be assembled in a particular order. In FIG. 2, the upper end 116 of the lower tube portion 108 of the first tubular section 102 is inserted into the lower end 140 of the upper tube portion 110 of the second tubular section 104. As a result, the lower tube portion 108 and upper tube portion 110 will be arranged as shown in FIG. 3. To join the upper tube portion 106 to the lower tube portion 108 to form the first tubular section 102, the lower end 114 of the upper tube portion 106 is inserted into the opening 135 at the upper end 138 of the upper tube portion 110, resulting in the arrangement of FIG. 4. As shown in FIG. 4, the lower end 120 of the lower tube portion 108 extends from the lower end 140 of the upper tube portion 110, and the upper end of the upper tube portion 106 extends out of the upper end 138 of the upper tube portion 110 in the axial direction. Accordingly, a person can hold the lower end 120 of the lower tube portion 108 and the upper end 118 of the upper tube portion 106 and join the lower end 114 of the upper tube portion 106 to the upper end 116 of the lower tube portion 108 inside the upper tube portion 110 of the second tubular section 104. It should be noted that the total length of the first tubular section 102, being comprised of upper tubular portion 106 and lower tubular portion 108, is longer than a length of the upper tube portion 110 of the second tubular portion 104. In FIG. 5, the first tubular section 102 is assembled and coaxially disposed inside the upper tube portion 110 of the second tubular section 104. The first tubular section 102 has been pulled through the upper end 138 of the upper tube portion 110 so that the lower end 120 of the lower tube portion 108 of the first tubular section 102 is inside the upper tube portion 110. As a result, the flanges 122 are deflected inward due to the force resulting between the toe portions 123 and the inner surface 502 of the upper tube portion 110, since the inside diameter 134 is a smaller distance than that across the toe portions 123 from one side to the other, in a direction perpendicular to the axial direction of the tube sections 102, 104. As a result, the first tubular section 102 is in contact with the second tubular section 104 at two regions, which are between the outer surface of the first tubular section 102 and the opening 135 at the upper end 138 of the upper tube portion 110, and between the outermost points of the toe portions 123 and the inner surface 502 of the upper and lower tube portions 110, 112. This arrangement remains the same regardless of the position of the first tubular section 102 in the second tubular section 104. FIG. 7 shows a cut-away view taken along the axis of the lower tube portion 108 of the first tubular section 104 inside the upper tube portion 110 of the second tubular section 104. The toe portions 123 are deflected inward and, as a result of the material to return to its natural un-deflected position, bear against the inner surface 502 of the upper tube portion 110. FIG. 13 shows side by side comparisons of an end view of the lower end 120 of the lower tube portion 108 of the first tubular section 102 with a cross section of either the upper or lower tube portion 110, 112 of the second tubular section 104 in a direction perpendicular to the axis of the tube sections 102, 104. The second tubular section 104 has an inner diameter 134, that is larger than the outer diameter of both the upper and lower tube portions 106, 108 of the first tubular section 102. However, a circle around the outer extent of the toe portions 123 has a diameter 1302 that is larger than diameter 134. Thus, when inserted into the second tubular section 104, as shown in FIG. 14, the toe portions and flanged are pushed inward. In FIG. 14 the same end view of the lower end 120 of the lower tube portion 108 is shown with the lower tube portion 108 inside the upper tube portion 110 of the second tubular section. Because the tube portions are pushed inward by the inner surface 502 of the upper tube portion 110, the flanges are also deflected inward as indicated by displacement difference 1402, showing the difference between the inner side of the flanges relative to the inner side of the main cylindrical wall of the lower tube portion 108. In FIG. 7 it can be seen that the opening at the upper end 138 of the upper tube portion 110 can be slightly narrower that the interior diameter 134, but still larger than the outside diameter of the lower tube portion 108.

Figure 8:
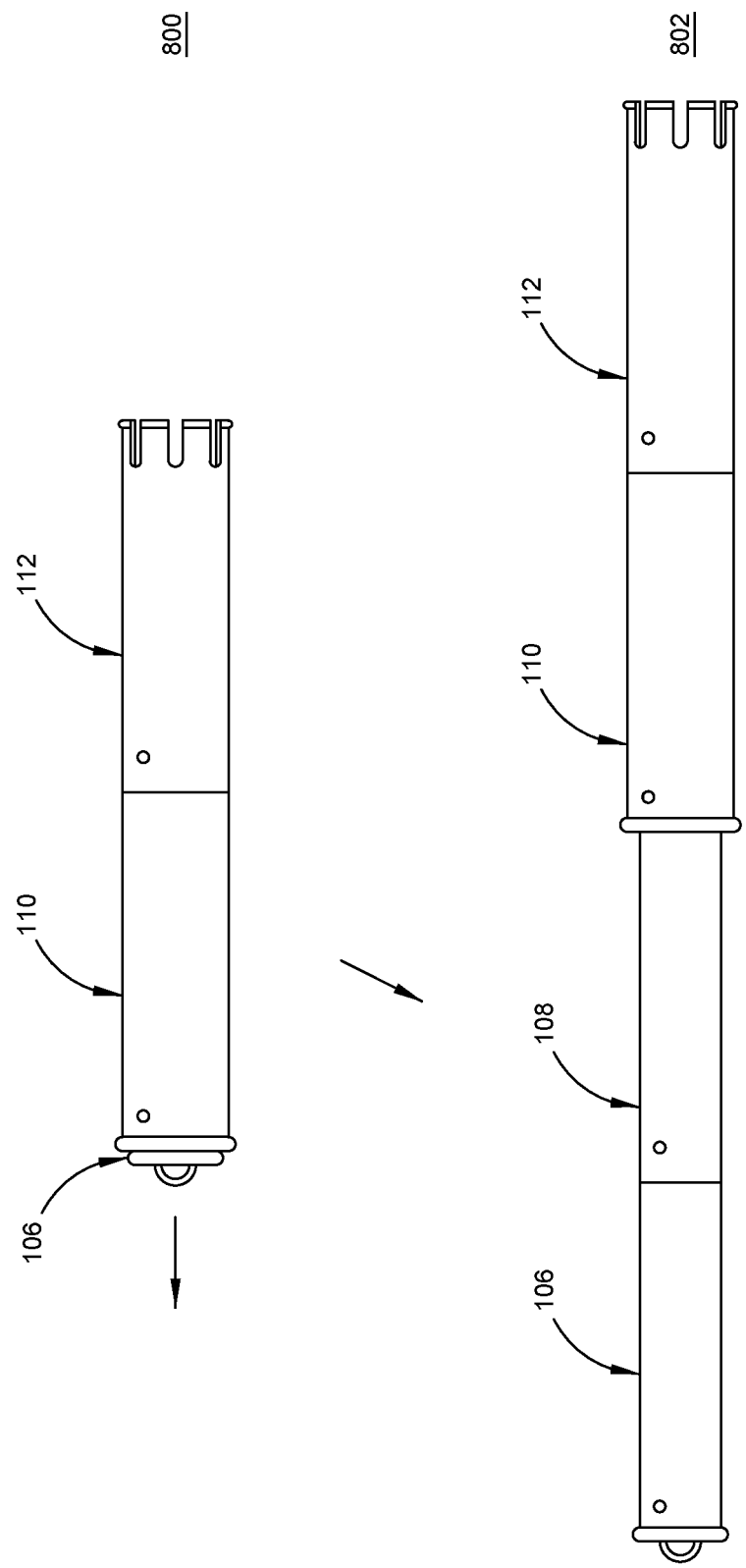
FIG. 8 shows extension of a telescoping fishing rod protector from a collapsed state to an extended state, in accordance with some embodiments.
Figure 11:
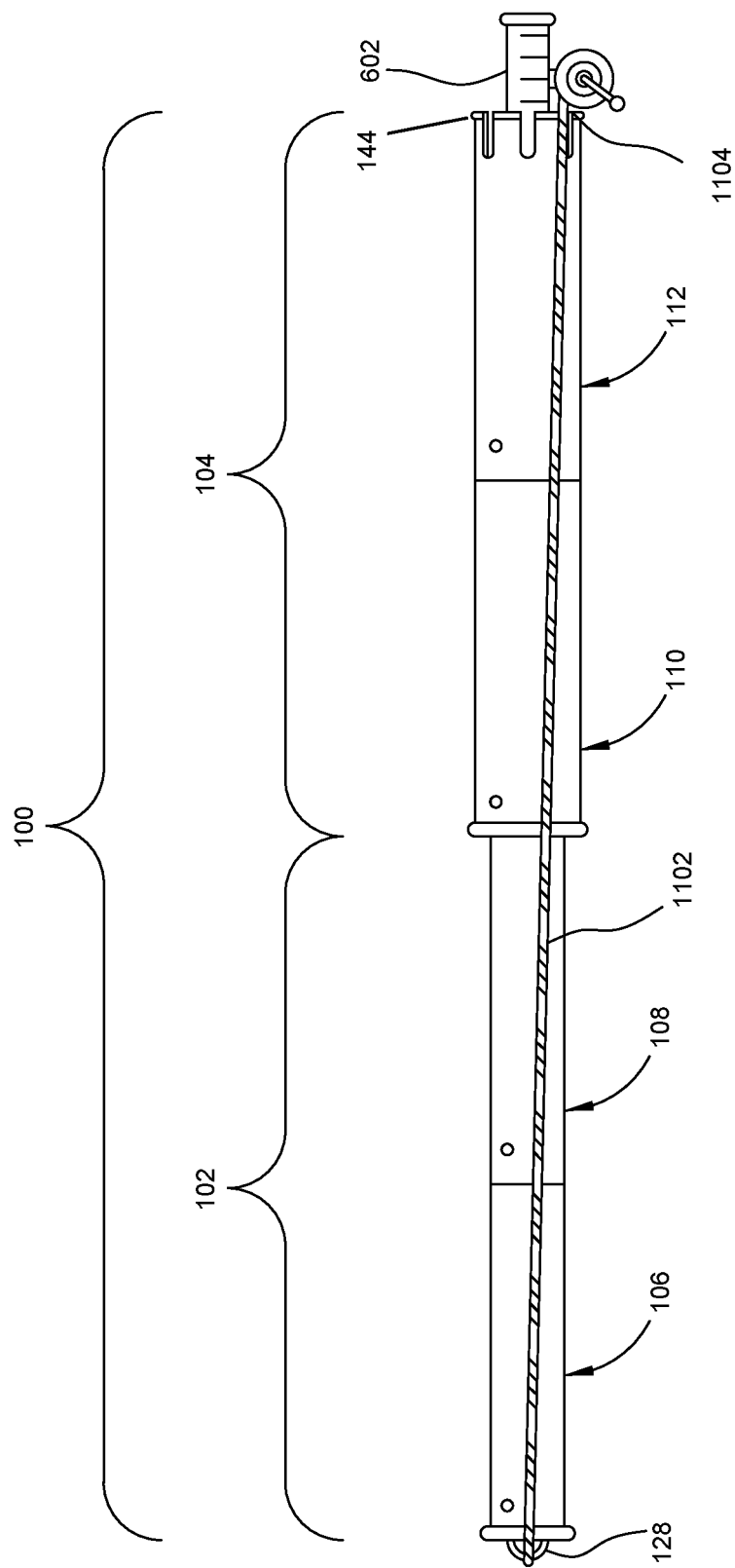
FIG. 11 shows an extended telescoping fishing rod protector placed over a fishing rod and retained by a lanyard, in accordance with some embodiments.
Figure 12:
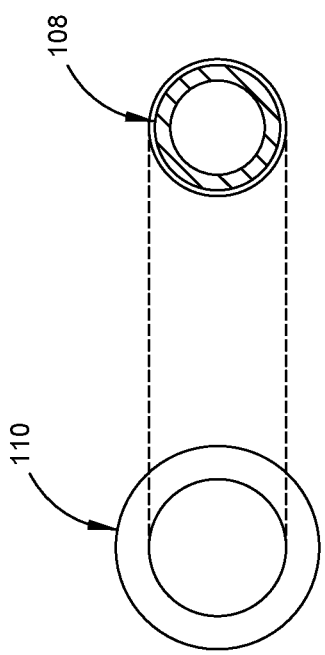
FIG. 12 shows an end view of the top of a larger section and a cut-away view of a smaller section sized to fit into the larger section, in accordance with some embodiments.

Returning to FIG. 6, once assembled, the first tubular section 102 can slide coaxially and telescopically within the second tubular section 104 to collapse or extend the two sections 102, 104 as desired. A fishing rod 602 can be inserted into the telescoping fishing rod protector 100 at the lower end 144, which is open. Once the fishing rod 602 is inserted it will be in the state as shown in FIG. 11. Referring to FIG. 11, a lanyard 1102 or similar cord can be tied or connected to the lanyard anchor 128 at one end of the lanyard 1102, and connected to the fishing rod 602 on a feature 1104 such as a handle of the fishing rod 602 at the other end of the lanyard 1104 to retain the telescoping fishing rod protector 100 on the fishing rod 602. FIG. 8 shows extension of a telescoping fishing rod protector 100 from a collapsed state 800 to an extended state 802. In the collapsed state 800 almost all of the first tubular section 102, comprised of upper and lower tube portions 106, 108, is within the second tubular section 104, comprised of upper and lower tube portions 110, 112. In state 802 the first tubular section 100 is fully extended, but can be extended to any intermediate position as well.

Figure 9:
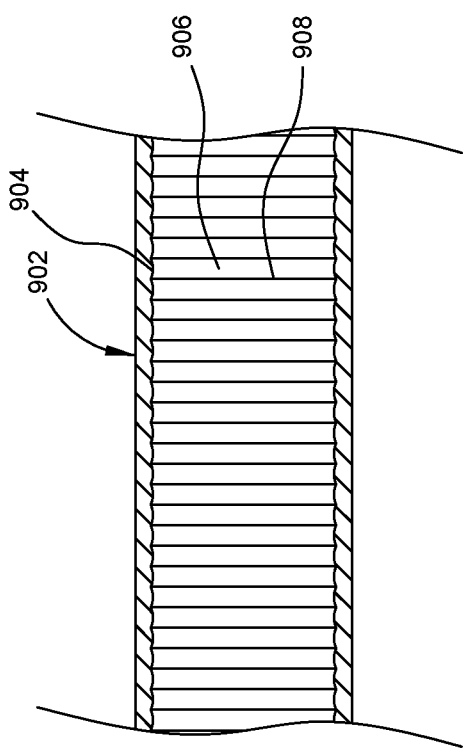
FIG. 9 shows a cut-away view of the inside of a section of a telescoping fishing rod protector using a ribbed wall, in accordance with some embodiments.
Figure 10:
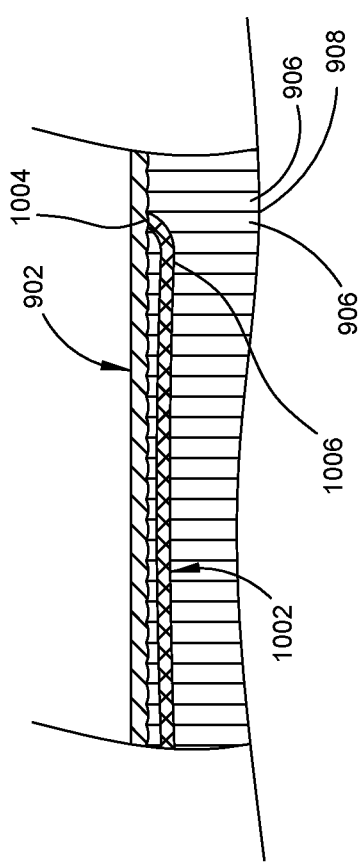
FIG. 10 shows a detail side cut-away view of two sections of telescoping fishing rod protector, in accordance with some embodiments.

FIG. 9 shows a cut-away view of the inside of a part 902 of a telescoping fishing rod protector using a ribbed wall, in accordance with some embodiments. The section 902 could be either or both the upper and lower tube portions of a tubular section, such as upper and lower tube portions 110, 112. In some embodiments the inner wall of the various tube portions can be flat and smooth, it is also contemplated that the inner wall can be ribbed or corrugated with annular ribs so as to produce peaks 904 and valleys 908 along the inner wall around the axis of the tube section. The valleys 908 provide a detent action for the toe portions 123 of a coaxially located tube portion inside part 902, and shown in FIG. 10. Tube portion 1002 has a lower end including flanges such as flange 1006 with toe portion 1004. Because diameter across the part 902 at both the peaks 906 and valleys 908 is less than the distance across the tube portion 1002 from toe portion to opposite toe portion, the toe portions 1004 and flanges 1006 are deflected inward, but when the toe portion 1004 is in a valley 908 a detent effect results, tending the hold the tube portion 1002 at that position, and the tube portion 1002 will resist lateral movement (i.e. in the coaxial direction) more than if the inner wall of tube part 902 were smooth. Thus, the overall length of the telescoping rod protector can be adjusted to a desired length, which can be maintained by the detent effect resulting from the structure shown here.

The disclosed fishing rod protector provides several benefits over the known prior art. For one, the overall length of the fishing rod protected can be selected by the user. In addition, the tube sections can be broken down into their respective upper and lower portions in order facilitate storage when not in use. Also, once assembled, the sections will stay together and not come apart. This is in contrast, for example, to conical sections that only produce a friction fit when one section is fully extended from a larger tube section. Thus, when fishing, the disclosed fishing rod protector can be collapsed down to about the length of one tube section without the user having to worry about the sections coming apart.

The claims appended hereto are meant to cover all modifications and changes within the scope and spirit of the present invention.

What is claimed is:

1. A telescoping fishing rod protector, comprising:
a first tubular section and a second tubular section, wherein the first tubular section fits coaxially inside the second tubular section;
each of the first and second tubular sections comprising an upper tube portion and a lower tube portion;
each of the upper and lower tube portions of the first and second tubular sections comprising a cylindrical wall having an upper end and a lower end, wherein the lower end of the upper tube portion couples to the upper end of the lower tube portion such that the cylindrical wall of the upper tube portion is continuous with the cylindrical wall of the lower tube portion along the upper and lower tube portions;
the upper end of the upper tube portion of the first tubular section having a rim that extends outward to an outer diameter that is greater than a diameter of an opening at the upper end of the upper tube portion of the second tube section; and
the lower end of the lower tube portion of the first tubular section having a plurality of flexible flanges that each have a toe portion that extends outward, relative to the cylindrical wall of the lower tube portion of the first tubular section and perpendicular to an axis of the lower tube portion of the first tubular section when the toe portions are not inside of the second tubular section, and wherein the flexible flanges bend inwards and the toe portions make contact with an inner surface of the second tubular section when the flexible flanges are inside the second tubular section.

2. The telescoping fishing rod protector of claim 1, wherein the upper end of the upper tube portion of the first tubular section comprises a lanyard anchor.

3. The telescoping fishing rod protector of claim 1, further comprising an opening formed through the cylindrical wall of at least one of the upper tube portion or the lower tube portion of the first tubular section.

4. The telescoping fishing rod protector of claim 1, wherein the toe portion of each one of the plurality of flanges comprises a rubber strip at an outermost region of the toe portion.

5. The telescoping fishing rod protector of claim 1, wherein the inner surface of the second tubular section comprises a plurality of annular ribs.

6. The telescoping fishing rod protector of claim 1, wherein the lower end of the upper tube portion couples to the upper end of the lower tube portion by a threaded boss that mates with a threaded recess.

7. The telescoping fishing rod protector of claim 1, wherein the upper end of the upper tube portion of the second tubular section comprises a rim.

8. A telescoping fishing rod protector, comprising:
a first tubular section having a cylindrical wall having an outer diameter and comprised of an upper tube portion and a lower tube portion and wherein the outer diameter of the first tubular section is continuous along the upper tube portion and the lower tube portion, the upper end of the upper tube portion having a rim that has an outer diameter that is larger than the outer diameter of the cylindrical wall, a lower end of the lower tube portion having a plurality of flanges, each flange having an outward-extending toe portion, wherein a diameter across the plurality of flanges at the toe portions is greater than the outer diameter of the cylindrical wall of the first tubular section;
a second tubular section having a cylindrical wall having an inner diameter that is greater than the outer diameter of the cylindrical wall of the first tubular section and less than the diameter across the plurality of flanges at the toe portions of the lower tube portion of the first tubular section, the second tubular section comprised of an upper tube portion and a lower tube portion wherein the inner diameter is continuous along the upper tube portion and the lower tube portion of the second tubular section, the upper tube portion of the second tubular section having an opening at an upper end of the upper tube portion that has a diameter greater than the outer diameter of the cylindrical wall of the first tubular section and less than the diameter of the rim; and
wherein the plurality flanges of the lower tube portion of the first tubular section bend inwards when the toe portions are inside the second tubular section.

9. The telescoping fishing rod protector of claim 8, further comprising an opening through at least one of the cylindrical wall of the first tubular section or the cylindrical wall of the second tubular section.

10. The telescoping fishing rod protector of claim 8, wherein the lower tube portion of the second tubular section having a plurality of flanges, each of the flanges has an outward-extending toe portion, wherein a diameter across the plurality of flanges at the toe portions is greater than an outer diameter of the cylindrical wall of the second tubular section.

11. The telescoping fishing rod protector of claim 8, wherein the upper end of the upper tube portion of the first tubular section comprises a lanyard anchor.

12. The telescoping fishing rod protector of claim 8, wherein the toe portion of each one of the plurality of flanges of the lower tube portion of the first tubular section comprises a rubber strip at an outermost region of the toe portion.

13. The telescoping fishing rod protector of claim 8, wherein inner surfaces of the upper and lower tube portions of the second tubular section comprise a plurality of annular ribs.

14. The telescoping fishing rod protector of claim 8, wherein a lower end of the upper tube portion of the first tubular section couples to an upper end of the lower tube portion of the first tubular section by a threaded boss that mates with a threaded recess.

15. The telescoping fishing rod protector of claim 8, wherein the upper end of the upper tube portion of the second tubular section comprises a rim.

16. A method for assembling a telescoping fishing rod protector, comprising:
providing a first tubular section comprised of an upper tube portion and a lower tube portion, the first tubular section having a cylindrical wall having an outer diameter, an upper end of the upper tube portion having a rim that has an outer diameter that is greater than the outer diameter of the cylindrical wall of the first tubular section, a lower end of the lower tube portion of the first tubular section having a plurality of flanges, each one of the flanges having a toe portion that extends outward relative to the cylindrical wall such that a diameter across the plurality of flanges at the toe portions is greater than the diameter of the cylindrical wall, wherein a lower end of the upper tube portion couples to an upper end of the lower tube portion of the first tubular section;
providing a second tubular section comprised of an upper tube portion and a lower tube portion, the second tubular section having a cylindrical wall having an inner diameter that is greater than the diameter of the cylindrical wall of the first tubular section and less than the diameter across the plurality of flanges at the toe portions of the lower end of the lower tube portion of the first tubular section, an upper end of the upper tube portion of the second tubular section having an opening having a diameter that is greater than the outer diameter of the cylindrical wall of the first tubular section and less than the diameter of the rim, wherein a lower end of the upper tube portion of the second tubular section couples to an upper end of the lower tube portion of the second tubular section;
inserting the lower end of the upper tube portion of the first tubular section through the opening at the upper end of the upper tube portion of the second tubular section;
inserting the upper end of the lower tube portion of the first tubular section into the lower end of the upper tube portion of the second tubular section;
coupling the lower end of the upper tube portion of the first tubular section to the upper end of the lower tube portion of the first tubular section inside the upper tube portion of the second tubular section;
moving the first tubular section so that the plurality of flanges and toe portions of the lower end of the lower tube portion of the first tubular section are inside the upper tube portion of the second tubular section such that the plurality of flexible flanges bend inwards when the toe portions make contact with an inner surface of the second tubular section; and
coupling the lower end of the upper tube portion of the second tubular section to the upper end of the lower tube portion of the second tubular section, thereby capturing the first tubular section inside the second tubular section in a telescoping arrangement.

* * * * *